Figure 1:
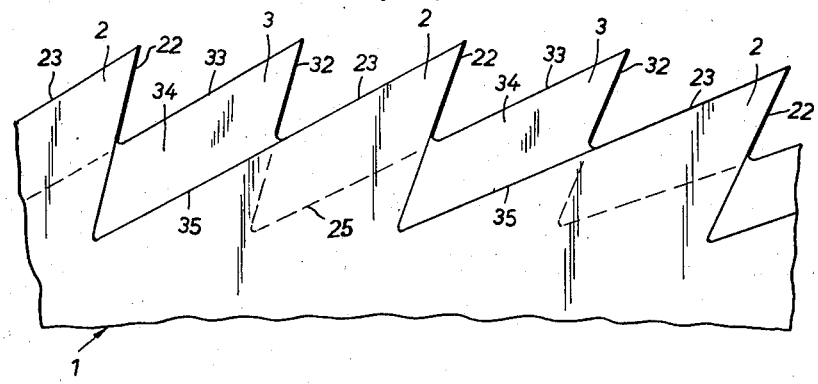

United States Patent Office 3,002,541
Patented Oct. 3, 1961

3,002,541
SAW BLADE
Oskar Wellauer, Zurich, Switzerland, assignor to Hintermeister & Co., Zurich, Switzerland
Filed May 19, 1958, Ser. No. 736,122
Claims priority, application Switzerland June 12, 1957
1 Claim. (Cl. 143—133)

The invention relates to saw blades and more particularly to a saw blade of the type having the teeth ground off laterally on either side in alternate sequence. Saw blades are employed under most varied operating conditions for chip removing cutting operations on various materials having substantially differing properties. Most frequently saw blades serve for the purpose of severing or cutting the material into parts, but often they are also used as forming tools, e.g. for generating slots, grooves and the like. Moreover, the kinds of material to be worked by such blades are very extensive, such materials comprising wood, synthetic materials, plastics, metals, ceramics, and many others.

The different working conditions and the various materials necessitate in each case individual cutting conditions. In order to obtain a high efficiency for the saw blades, the shape of the saw teeth is made to conform to the prevailing cutting conditions. However, the shape of the teeth represents the only decisive factor for the efficiency of a saw blade.

The efficiency of removal of chips generally is of great importance in cutting operations and particularly for the operation of saw blades, chip removal is a dominant factor. Such tools actually work seldom on the surface of materials. The cutting operation mostly takes place in gaps, grooves or slits, the width of which as a rule, does not exceed the thickness of the blade. The cut off and raised chip assumes most varied forms and dimensions, dependent on the nature of the material to be cut and according to the prevailing cutting conditions, and even disintegrates sometimes into several pieces. This chip is at first received in the gullet, which is formed by the front of the actually cutting tooth together with the back of the preceding tooth. Entrained in this gullet, the increasingly growing chip is then moved to the point where the tooth leaves the cutting zone in which a most rapid removal of chips is desired.

The gullets thus must provide space for the reception of chips. This requirement limits the desire to obtain with given dimensions a greatest possible number of teeth in the interest of a high efficiency and long service life of the saw blades.

It has been found that the spaces between each two teeth have the tendency to be easily clogged up, even when sufficiently large gullets are provided. As a result the saw blade will jam, overheat, corrode, warp and finally be destroyed, entailing waste and eventually damages to the machine. A certain improvement could in fact be obtained by laterally grinding off the teeth on either side in alternate sequence for correcting the cutting conditions, since the quantity of chips accumulating in one gullet was thereby decreased, but the results obtained have not been satisfactory.

The present invention is based on the knowledge that not only the presence of a gap between two saw teeth but also the shape of the provided gullet is of decisive importance for moving and discharging the produced chips. It has been found that by a suitable shape, particularly of the back of a tooth limiting a gullet, a chip entering this gullet can be so deformed as to be easily moved and evacuated.

The saw blade according to the present invention comprises teeth, of which the lateral ground face is limited by the front and the back of this tooth and by the front of the succeeding tooth, and in addition by a line forming the extension of the line of intersection of the back of the preceding tooth with the respective lateral face of the saw blade disc.

In a preferred construction of the saw blade according to the invention the area of the ground face of a tooth is smaller than the area of the non-ground face of the tooth, when viewed in the projection of a tooth at right angles to the plane of the blade and bounded by the root line of the tooth.

Figure 2:
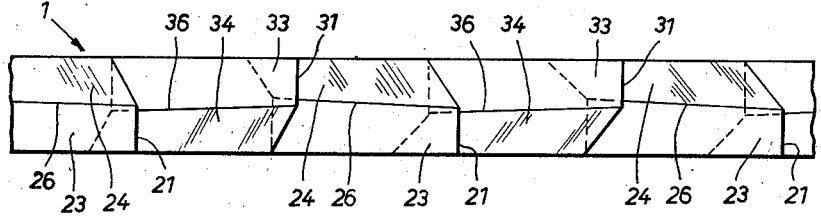
Figure 3:
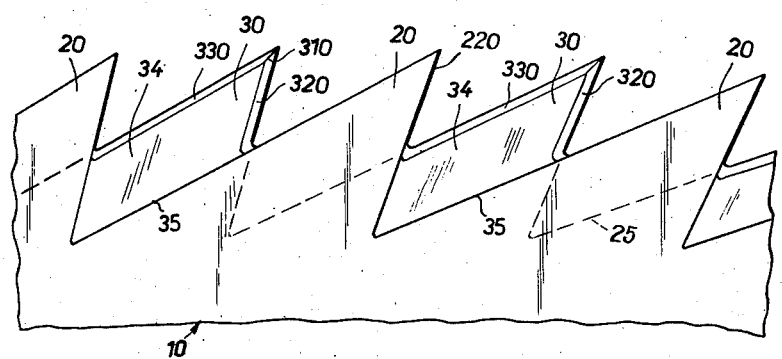
Figure 4:
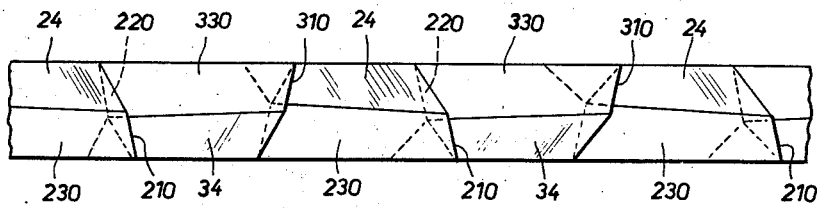
Figure 5:
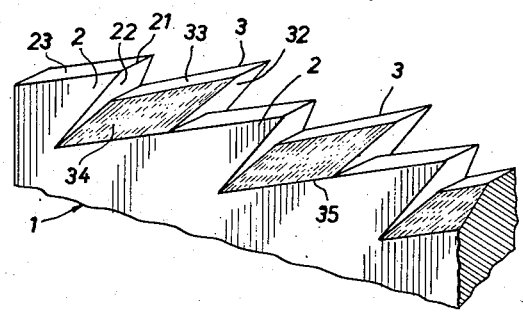

The invention will now be more particularly described, by way of example, with reference to the accompanying drawings, in which:

FIGURE 1 shows a side view of a portion of the toothed section of a saw blade according to the invention, FIGURE 2 is a plan view of the same portion, FIGURE 3 shows a side elevation of a portion of the toothed section of a modified saw blade construction, FIGURE 4 is a plan view of the blade shown in FIGURE 3, FIGURE 5 is a perspective view of the saw blade shown in FIGS. 1 and 2.

The arrangement of the teeth along a peripheral line of great radius of curvature, as shown in FIGURE 1, shall by no means be construed as limiting the invention to circular saws.

For the sake of simplicity a saw blade has been chosen, of which the teeth are completely bounded by plane surfaces. However the invention may also be applied to saw blades and toothed sections of all types, thus also in cases, where for instance the back or the laterally ground face of the tooth consist of curved surfaces.

The saw blade 1 is provided on its periphery with teeth 2, 3, which are ground off laterally in alternate sequence at one side and at the other side. Owing to the laterally ground faces alternately provided on either tooth side, the cutting edges 21 or 31 of the teeth 2 and 3, respectively, extend from the respective lateral surfaces of the saw blade 1 slightly beyond half the thickness of the blade towards the other side, so that the teeth on one side thereof always work only over a portion of the entire cutting zone of the saw blade. In the shown example the plane front and back surface 22, 32 and 23, 33 of the teeth 2 or 3 extend from the corresponding cutting edges at right angles to the lateral surfaces of the saw blade towards the root of each tooth.

The laterally ground plane surfaces 24 or 34 of the teeth 2 and 3, respectively, are directed each so that their line of intersection with the lateral face of the saw blade is situated in the extension of the line of intersection of the back surface of the preceding tooth with the respective lateral surface. In FIGURE 1 these lines of intersection 35 of the ground surfaces 34 are shown on the front face while the lines of intersection 25 of the surfaces 24 are on the back face of the disc. In the embodiment shown, the sectional lines 26 or 36 of the ground surfaces 24 or 34 with the back surfaces of the teeth are straight lines. This condition, however, is not imperative since it is also possible to provide a saw blade according to the invention with curved surfaces on the back of the tooth, and the ground surfaces would then also be curved, resulting into lines of intersection 25 or 35 curved in the plane of the disc and lines of intersection 26 or 36 curved in space. Of course, the curved lines of intersection 25 and 35 would represent continuations of the lines of intersection of the back faces of the tooth with the corresponding lateral faces of the saw blade.

Due to the laterally ground face of the teeth, provided according to the invention, for instance a tooth gullet in front of a tooth 2 now extends alongside the ground surface 34 of the preceding tooth 3 until the next gullet located between said preceding tooth 3 and the second preceding tooth 2. The tooth gullets extended in the described manner now communicate with each other in such a manner that for instance cooling air or cooling fluid may flow in a practically uninterrupted stream through the cutting zone of the saw blade. Owing to the width of the ground surfaces, which approximately corresponds to the height of the tooth, said stream of coolant actually covers the entire gap between each pair of teeth and thus effectively lubricates and cools not only the saw blade but also the produced chips, and in addition simultaneously loosens the latter, so that the efficiency of the cutting operation is increased, while the risk of clogging-up the saw teeth is diminished.

The lateral grinding of the saw teeth in accordance with the teaching of the present invention offers further additional advantages. Assuming for instance, the working of a certain material would produce long flowing chips. The risk of clogging-up the gullets in such a case would be particularly great. In operating with a saw blade of known type, each chip cut for instance by a tooth 2 will curve up towards the tooth back 33 of the preceding tooth 3 and subsequently will coil up in superposed windings by the progressing cutting action, the back of the tooth serving as guiding surface. With a saw blade according to the invention, however, the chip during the formation of coils is laterally deflected by the ground surface extending until the tooth root of the cutting tooth, so that the coils of the chip will not become superposed, but substantially situated side by side. The chip thus is no longer positioned in the tooth gullet in form of a spiral of steadily increasing diameter, but follows a helical line growing in axial direction. The axis of said helical line must not necessarily be rectilinear, but may also be a curve, caused for instance by the influence of a curved ground surface.

From the aforementioned explanations it is quite evident that in the described process the chip is widely distributed across the available space of a tooth gap. By means of the described arrangement and by avoiding a spiral chip formation, the risk of clogging up the saw teeth is thus substantially reduced, while at the same time the evacuation of the helical chip from the tooth gap is facilitated by the spring action of the chip and also by the position the chip assumes in said gap. The laterally ground surface provided according to the invention, further is advantageous in that a much greater space for deflection and coiling is available to the chip, sliding along the front of a tooth, between this tooth front and the laterally ground surface of the next tooth, than for instance in the customary formation of the gullets. The coils of the chip are thereby less closely positioned. These features are very well evident from FIGURE 1.

Through the above described example of the invention referred to cutting of a material forming long flowing chips, it is clear that the advantages of the improved saw blade will also fully appear with short ships of the crumbly type. Saw blades, circular saws or reciprocating saws according to the invention permit trouble-free operation at particularly high cutting speeds and depth of cutting.

In the example of embodiment shown in FIGURES 3 and 4, the flat front faces 220 or 320 and the back faces 230 or 330 of the teeth 20 and 30, respectively, do not extend at right angles to the lateral faces of the saw blade, and the cutting edges 210 and 310, respectively are directed under an oblique angle with respect to the side faces of the saw blade.

Also in this example the laterally ground surfaces 24 or 34 of the teeth 20 and 30, respectively, are limited, each by the front and back of this tooth, by the front of the following tooth and by the extended line of intersection 35 or 25 of the tooth back of the preceding tooth, with that lateral surface of the saw blade, on which the ground section is situated. Similar to the first example of the embodiment, the tooth gullets are also here extended and communicate with each other, so that coolant and lubricating agents, which are applied during operation of the saw blade, may freely contact the entire operating zone.

The inclination of the cutting edges 210 or 310 with respect to the plane of the saw blade under an angle deviating from right angle, necessarily results into an inclined position at least of the front of the tooth, or of the back of the tooth, or, as shown, of both tooth surfaces. In connection with the subject of the invention, a particular shape of the gullet is obtained, in which the cutting edge and the front portion of the tooth—and eventullly also the back of the tooth—actively cooperate with the laterally ground surfaces during the deflection and coiling of the chips, or already prepare the chips for their passage along said ground surfaces. Thereby the removal of chips is substantially facilitated. An additional advantage consists in that the inclined front surfaces effectively promote the flow of coolant and the shape of the tooth gap favours flowing motion.

The described formation of the saw blade according to the second embodiment of the invention results in a further considerable increase in cutting efficiency, in cutting quality and in stability of the saw blade.

I claim:

A saw blade comprising spaced cutting teeth having a front surface, a back surface and a cutting edge formed by the intersection of said surfaces, the side faces of the teeth being ground-off alternately on opposite sides of successive teeth, the ground portion of each tooth being limited by the front face and the back face of said tooth, an extension of the front face of the next following tooth and by a line forming substantially the extension of the line of intersection of the back of the preceding tooth with the respective side face of the saw blade.

References Cited in the file of this patent

UNITED STATES PATENTS

| | | |
|---|---|---|
| 352,867 | Greist | Nov. 16, 1886 |
| 858,652 | Harrison | July 2, 1907 |
| 1,782,507 | Huther | Nov. 25, 1930 |
| 2,840,125 | Kirksey | June 24, 1958 |

FOREIGN PATENTS

| | | |
|---|---|---|
| 764,363 | Great Britain | Dec. 28, 1956 |
| 8,323 | Great Britain | Apr. 14, 1908 |